Dec. 15, 1959     W. STOKKING, JR     2,916,897
SHEAR PIN ASSEMBLY FOR MARINE ENGINES
Filed Dec. 18, 1958
FIG.1
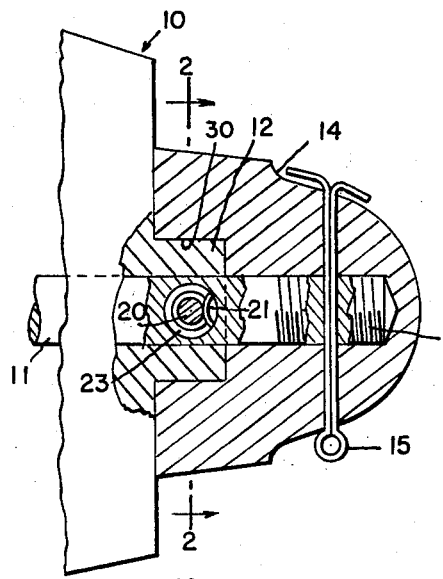
FIG.2
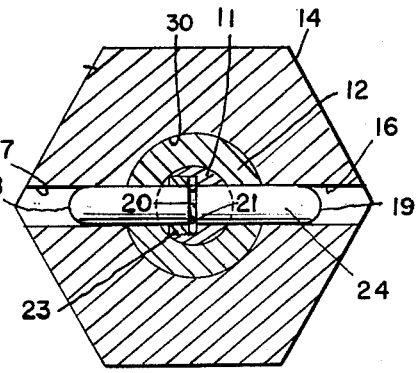
FIG.3
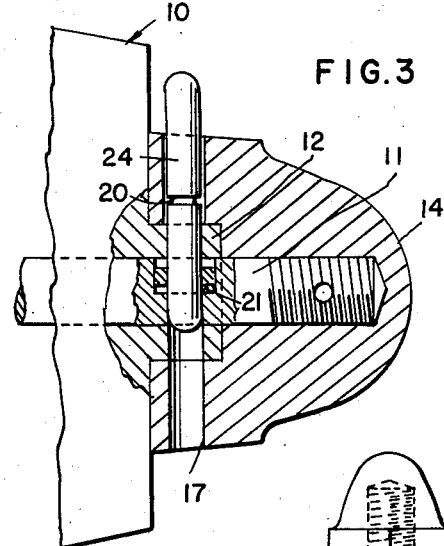
FIG.4
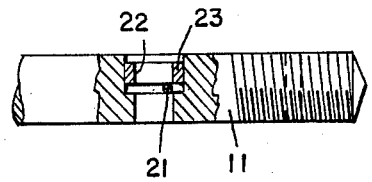
FIG.5
FIG.6
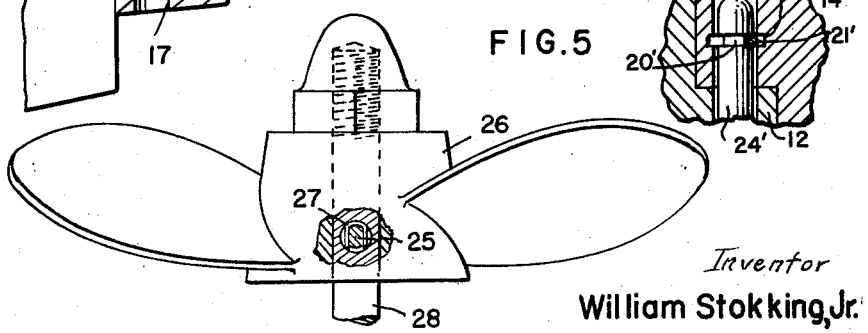
*Inventor*
William Stokking, Jr.
By *Shoemaker & Mattare*
ATTYS

United States Patent Office 2,916,897
Patented Dec. 15, 1959

2,916,897

SHEAR PIN ASSEMBLY FOR MARINE ENGINES

William Stokking, Jr., Euclid, Ohio

Application December 18, 1958, Serial No. 782,348

8 Claims. (Cl. 64—28)

This invention relates to a novel construction particularly adapted for use in connection with marine engines and more particularly to marine engines of the outboard type and is directed to the combination of a shaft and shear pin assembly for drivingly connecting a propeller hub upon the propeller drive shaft.

This application is a continuation-in-part of my application Serial No. 610,469, filed September 22, 1956, now abandoned.

In marine engines, the propeller hub and its attached propeller blades are normally secured to the propeller drive shaft by means of a shear pin and there is also associated therewith a retaining nut threaded onto the outer free end of the propeller drive shaft to prevent longiudinal movement of the propeller hub along the shaft. The purpose of the shear pin is to permit the drive between the propeller drive shaft and the propeller to be disconnected should the propeller become fouled or strike an obstruction or otherwise be subjected to an overload, thus preventing or at least minimizing possible damage to the propeller blades. Normally, in order to change or replace a shear pin of the conventional type, it is necessary to completely remove the retaining nut on the propeller shaft and to remove the propeller hub and remove any remaining broken pieces of the shear pin from both the propeller drive shaft and the hub and then re-engage the propeller hub on the drive shaft and drive in a new shear pin, afterwards replacing the retaining nut and locking it in place. This procedure is not only time consuming but it also introduces the danger of losing the retaining nut or the propeller hub assembly overboard during the removal process, particularly since the person replacing the shear pin does not wish to go to the trouble of completely dismounting the engine and bringing it inboard during the replacing process and, usually the shear pin is removed with the outboard engine tilted up and with the person leaning overboard to reach the propeller hub and shaft assembly.

It is, therefore, a primary object of this invention to provide a novel combination of propeller shaft, propeller hub and shear pin wherein the shear pin is normally held in place by such a means as permits the shear pin to be loosely engaged with the bores in the propeller hub and propeller shaft which normally receive this pin so that should the shear pin become broken due to an overload on the propeller, the remaining broken pieces of the shear pin will either drop out under their own weight or under the spinning action of the propeller or will permit removal thereof by forcing in a new shear pin assembly without removing the retaining nut and propeller hub from the propeller shaft.

Another object of this invention is to provide a combination in conformity with the preceding object wherein the means for retaining the shear pin within the bores of the propeller hub and propeller drive shaft comprises a spring which engages within a groove in the outer surface of the shear pin and which prevents longitudinal displacement thereof and normally retains the pin in place but which will permit its easy removal should the pin become broken.

Another object of this invention is to provide a combined shear pin assembly in accordance with the foregoing object wherein the spring comprises an arcuate leaf-type spring held in place within one of the bores and normally having a portion thereof urged into engagement within the groove in the shear pin but being capable of deformation so as to release the pin and be forced out of the groove against the tension of the spring.

With the above and other objects in view, the invention consists in the construction and novel combination and arrangement of parts hereinafter fully described, illustrated in the accompanying drawing and pointed out in the claims hereto appended, it being understood that various changes in the form, proportions, and minor details of construction, within the scope of the claims, may be resorted to without departing from the spirit or sacrificing any of the advantages of the invention.

In the drawing:

Fig. 1 is an elevational view partly in section taken of a portion of a propeller hub, the propeller drive shaft and the retaining nut and showing the shear pin in operative position in the manner in which it is associated with the assembly;

Fig. 2 is a vertical section taken substantially along the plane of section line 2—2 in Fig. 1 and showing the manner in which the spring mechanism is staked in place;

Fig. 3 is a view similar to Fig. 1 showing a new shear pin being inserted;

Fig. 4 is a longitudinal section of the drive shaft and showing the relationship between the drive shaft and the spring retaining means for the shear pin and the manner in which this retaining means is held in place;

Fig. 5 is an elevational view of a propeller drive hub and associated drive shaft and retaining nut and illustrating a modified form of the invention; and Fig. 6 is a partial sectional view of the retaining nut and showing a further modified form wherein the groove is in the bore within the retaining nut.

Referring now more particualrly to Fig. 1, the reference numeral 10 indicates in general a portion of a propeller hub which carries the usual propeller blades and which is provided with a longitudinal bore through which the engine shaft 11 or propeller drive shaft projects and the outer extremity in this particular instance of the propeller hub is provided with an annular shoulder 12 surrounding the drive shaft 11 and which cooperates in the manner presently set forth with the shear pin assembly to affix the propeller hub to the drive shaft 11 for common rotation therewith. The outer free end 13 of the propeller drive shaft 11 is threaded and has engaged thereon a nut or retaining means 14, the retaining means being fixed to the drive shaft by means of a cotter pin 15, all as is conventional. The inner side of the nut 14 is recessed as at 30 to receive the annular shoulder 12 of the propeller hub and, as is shown most clearly in Fig. 2, the nut 14, the drive shaft 11 and the annular shoulder 12 of the propeller hub are provided with transversely extending axially alignable bores 16 and 17 within which a shear pin 24 normally rests, thus establishing a driving connection between the shaft 11 and the propeller hub. When the parts are initially assembled, during manufacture, the nut is fully engaged against the propeller hub and at this point the nut 14, the shoulder 12 and the drive shaft 11 are simultaneously drilled to provide the aligned apertures therethrough so that when the nut is fully engaged upon the propeller shaft and against the hub, these bores will be in axial alignment. This permits a new pin to be inserted without backing off the nut or in any way disturbing its relationship with the shaft and the propeller hub. It may be necessary, however, to utilize any suitable tool such as a screwdriver blade and the like to pry the hub outwardly so as to bring all of the bores into axial alignment when a new pin is to be inserted, but the essence of the invention resides in the provision of these axially aligned bores and the cooperable pin and retaining means for the pin wherein the nut need not be disturbed whatsoever when a new pin is inserted.

The pin itself 24 is provided with tapered end portions 18 and 19 to permit easy insertion of the new pin and the pin is provided with a circumferentially extending notch 20 which is adapted to cooperate with a spring clip member 21 retained within the propeller shaft 11 so as to longitudinally local the shear pin. In this embodiment of the invention, the spring clip 21 is arcuate in configuration and is received within a counterbore 22 in the drive shaft 11, the spring clip 21 being disposed in the bottom of this counterbore and retained therein by means of a sleeve 23, see particularly Fig. 4, which is driven into the counterbore and provides a retaining notch with the bottom of the counterbore to retain the spring clip 21 in place. The sleeve 23 is not driven tightly against the spring clip but is loosely engaged therewith to permit easy deformation of the spring clip when the shear pin is first forced into the bores in the hub portion 12 and the drive shaft 11 while permitting the resiliency of the spring clip to snap the same into the groove 20 of the shear pin when the same is in place and thus hold it in longitudinal position.

Fig. 3 serves to illustrate the manner in which a new shear pin may be inserted into the device. In this instance, it will be noted that the nut 14 has not been disturbed but that the parts have been relatively rotated so that the bore 17 of the nut will align axially with the bores in the propeller hub shoulder 12 and the drive shaft 11 so that the new pin 24 may be inserted. Should any portion of the old pin remain within the bores in the shoulder 12 or drive shaft 11, the new pin will force the same outwardly as it is forced into position. The opposite ends or noses 18 and 19 on the shear pin serve to cam the spring clip 21 out of the way during the insertion of the new pin.

Fig. 5 illustrates a modified form of the invention wherein the shear pin 25 projects through the main body portion of the propeller hub 26 and in this case, the spring clip 27 is of hairpin like configuration, being retained within the drive shaft 28 in the same manner as is set forth in Fig. 4. In this modification, however, the spring clip engages within the shear pin circumferential groove at diametrically opposed points thereof rather than in a single portion as is the case with the spring clip 21 in Figs. 1–4 inclusive.

The further modification as shown in Fig. 6, depicts a groove 32 in either of the bores 16, 17 in the retaining nut 14 with a spring 21' mounted therein. The spring 21' engages a groove 20' cut in the shear pin 24' such groove being toward one end of the shear pin or intermediate the ends thereof.

By utilizing the invention as above described, it is possible to very rapidly and easily replace a broken shear pin without necessitating removal of the propeller retaining nut or the propeller hub. It may be necessary to utilize a pry bar to urge the propeller hub longitudinally along the drive shaft so as to attain axial alignment of the various bores for inserting the new shear pin. In this respect, it is to be noted that the shear pin is of slightly smaller diameter than the bores within which it is received so that it is fairly loosely engaged therewithin since there is no necessity for a drive fit between these parts because of the use of the spring clip mechanism for retaining the shear pin against longitudinal movement.

In many cases, when the pin shears, the broken pieces will fall out under their own weight and it will not be necessary for the new shear pin to forcibly remove any remaining pieces. However, in any event, insertion of the new pin requires very little effort and yet the pin is securely locked against longitudinal movement once it is properly positioned and the spring clip has engaged within the circumferentially extending groove therein.

Some marine engines or outboard motors use a cap nut such as that shown at 14 on the drawing while others use a cap-like member of the same configuration as the nut 14 but such member does not have threads thereon nor does the shaft have corresponding threads. The cap member is held on by a means such as a cotter pin similar to the cotter pin 15 shown on the drawing.

I claim:

1. In a marine engine having a drive shaft member, a propeller hub member loosely mounted on the shaft member, and a nut member threadedly engaging an end of the shaft member with portions of the nut member extending over portions of the propeller hub member and holding the propeller hub member against longitudinal movement on the shaft member, means for locking the nut member to the shaft member, each of the members having alignable openings therethrough, a shear pin received in the openings when aligned and connecting all of the members together, and means within the opening of one of the members for retaining the shear pin against axial movement and preserving the connection between the members.

2. A marine engine as set forth in claim 1 wherein the means for retaining the shear pin within the aligned openings is a spring means.

3. A marine engine as set forth in claim 1 wherein the means for retaining the shear pin within the aligned openings is a spring clip.

4. A marine engine as set forth in claim 1 wherein the means retaining the shear pin in the aligned openings is mounted within the drive shaft member opening.

5. A marine engine as set forth in claim 1 wherein the shear pin is provided with a circumferential groove intermediate its ends with the retaining means engaging the groove to hold the pin in the aligned openings.

6. A marine engine as set forth in claim 1 wherein the retaining means is mounted in a circumferential groove within the opening in one of the members.

7. A marine engine as set forth in claim 1 wherein the means retaining the shear pin in the aligned openings is mounted within the nut member.

8. In a marine engine having a drive shaft, a propeller and a hub therefor loosely mounted on the shaft, and a member mounted on an end of the shaft and retaining the propeller on the shaft, the member having portions extending over portions of the propeller hub, means for locking the member to the shaft, the shaft, propeller hub and the member having alignable bores therethrough, a shear pin received in the bores when aligned and connecting the shaft, propeller hub and the member together so that the propeller is driven by rotation of the shaft, the member having a circumferential groove within one of its bores, a spring means seated within the groove, the shear pin having a circumferential groove intermediate the ends thereof, the spring means engaging the groove of the shear pin when the pin is inserted within the aligned bores and retaining the pin against transverse movement within the bores so as to preserve the driving connection between the shaft and the propeller hub.

References Cited in the file of this patent

UNITED STATES PATENTS

| 1,746,806 | Weidinger | Feb. 11, 1930 |
| 2,438,676 | Nickle et al. | Mar. 30, 1948 |
| 2,566,690 | Wright | Sept. 4, 1951 |

FOREIGN PATENTS

| 195,524 | Great Britain | Apr. 5, 1923 |
| 344,456 | Germany | Nov. 25, 1921 |